United States Patent
Palo

(10) Patent No.: US 12,052,664 B2
(45) Date of Patent: Jul. 30, 2024

(54) MULTI-SUBSCRIBER IDENTITY MODULE (SIM) SELECTION OF PRIMARY SIM FOR WAKEUP SIGNAL DETECTION

(71) Applicant: QUALCOMM Incorporated, San Diego, CA (US)

(72) Inventor: Nigam Mohan Palo, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 356 days.

(21) Appl. No.: 17/683,159

(22) Filed: Feb. 28, 2022

(65) Prior Publication Data

US 2023/0276358 A1    Aug. 31, 2023

(51) Int. Cl.
*H04W 52/02* (2009.01)
*H04W 8/18* (2009.01)
*H04W 72/23* (2023.01)

(52) U.S. Cl.
CPC ....... *H04W 52/0232* (2013.01); *H04W 8/183* (2013.01); *H04W 72/23* (2023.01)

(58) Field of Classification Search
None
See application file for complete search history.

(56) References Cited

U.S. PATENT DOCUMENTS

2021/0006963 A1*  1/2021  Chauhan ............... H04L 1/0026

* cited by examiner

*Primary Examiner* — Suhail Khan
(74) *Attorney, Agent, or Firm* — Patterson+ Sheridan, L.L.P.

(57) ABSTRACT

Certain aspects of the present disclosure provide techniques for a user equipment (UE) to select a primary subscriber identity module (SIM) for wakeup signal detection and decoding. One example method for wireless communication by a UE having a first SIM and a second SIM includes selecting, from the first SIM and the second SIM, a primary SIM and a secondary SIM; decoding, by the primary SIM, downlink control information (DCI); indicating, by the primary SIM to the secondary SIM, a wakeup grant based on the DCI; and taking one or more actions, by at least one of the primary SIM or the secondary SIM, in response to the indication of the wakeup grant.

30 Claims, 9 Drawing Sheets

US 12,052,664 B2

MULTI-SUBSCRIBER IDENTITY MODULE (SIM) SELECTION OF PRIMARY SIM FOR WAKEUP SIGNAL DETECTION

INTRODUCTION

Aspects of the present disclosure relate to wireless communications, and more particularly, to techniques for selecting a primary subscriber identity module (SIM) for wakeup signal detection.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method of wireless communications by a user equipment (UE) having a first subscriber identity module (SIM) and a second SIM. The method generally includes: selecting, from the first SIM and the second SIM, a primary SIM and a secondary SIM; decoding, by the primary SIM, downlink control information (DCI); indicating, by the primary SIM to the secondary SIM, a wakeup grant based on the DCI; and taking one or more actions, by at least one of the primary SIM or the secondary SIM, in response to the indication of the wakeup grant.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Figure 1:
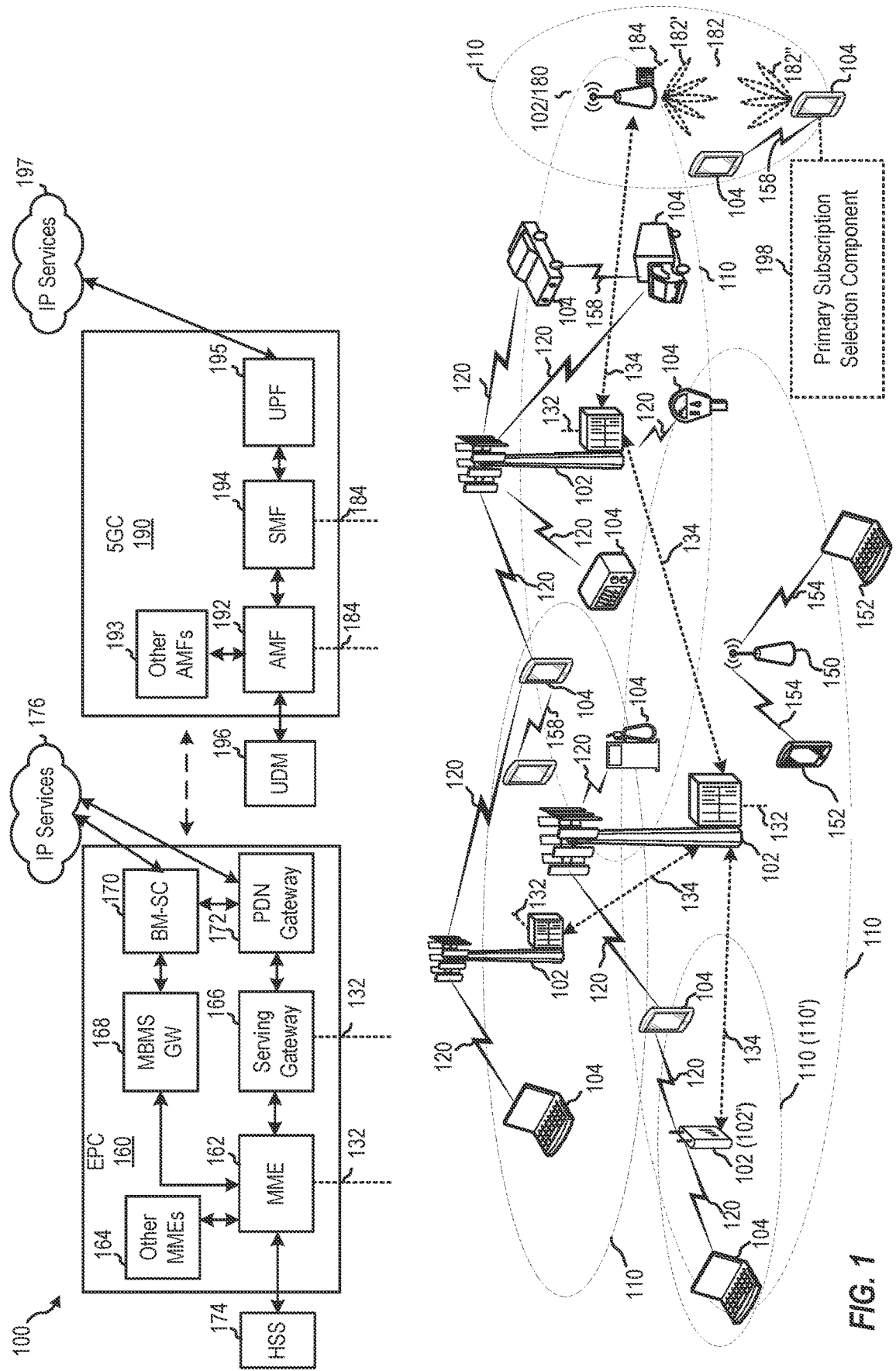
FIG. 1 is a block diagram conceptually illustrating an example wireless communication network.

Aspects of the present disclosure provide apparatuses, methods, processing systems, and computer-readable mediums for a multi-subscriber identity module (SIM) user equipment (UE) to select a primary SIM for wakeup signal detection.

In some wireless communications networks, a network (e.g., a network entity, such as a BS) may configure a UE to perform connected mode discontinuous reception (C-DRX), wherein a receiver(s) of the UE is activated (e.g., powered up or tuned to the network's frequency band) during C-DRX on-durations at regular intervals and deactivated (e.g., powered down or tuned to another frequency band) during C-DRX off-durations between those intervals. If the network has data to transmit to the UE, then the network delays that transmission until an on-duration when the UE's receiver will be active. Upon beginning to receive a transmission from the network, the UE keeps its receiver active until the network has stopped transmitting to the UE for a period. By using C-DRX, a UE may save power as compared to having a receiver of the UE continually active. However, some UEs that have multiple SIMs, are experiencing relatively high mobility (e.g., mobility that is high enough to cause an increase in synchronization errors, such as walking speed with mmWave communications, automobile speeds for lower frequencies, or lower speeds for lower frequency communications in dense, urban environments) or are running applications communicating (e.g., transmitting or receiving) critical data (e.g., data of ultra-reliable low-latency communications (URLLC), data for applications with low-latency quality of service (QoS) characteristics, or data for applications with high reliability QoS characteristics) may have the reliability or performance of the connection to the network negatively impacted by being configured with some C-DRX parameters.

In aspects of the present disclosure, a UE may detect a condition which may cause some C-DRX parameters to negatively impact reliability or performance of a connection to a wireless network, and in response the UE may transmit a request to change the C-DRX parameters. For example, a UE that has multiple SIMs (e.g., a multi-SIM UE) supporting multiple network subscriptions may be configured such that C-DRX on-durations on a first subscription consistently conflict with (e.g., overlap in time) paging opportunities (POs) of a second subscription. In the example, the UE can transmit a request to change an offset or length of the C-DRX on-durations so that the on-durations do not consistently conflict with the POs of the other subscription, and the UE is less likely to miss pages from the network of the other subscription. In another example, a multi-SIM UE may be configured such that C-DRX on-durations of a first subscription consistently conflict with C-DRX on-durations of a second subscription, and the UE may request to change an offset or length of one or both of the C-DRX configurations to that the on-durations of the two subscriptions conflict less often. In still another example, a UE may be experiencing high mobility, which is causing the UE to have frequent changes to a timing advance (TA) parameter of the UE. In this example, the UE can request to shorten intervals between on-durations so that the UE can receive the more frequent TA changes from the network. In yet another example, a UE may be running an application that communicates critical data, and the UE may request to shorten intervals between on-durations so that the UE can transmit or receive the critical data more often.

By requesting a change to C-DRX parameters, a UE can notify the network to change the C-DRX parameters, and, if the network makes the requested change, then reliability or performance of the connection to the wireless network can be improved. This may improve overall reliability of the wireless communications system.

Introduction to Wireless Communication Networks

FIG. 1 depicts an example of a wireless communication network 100, in which aspects described herein may be implemented.

Generally, wireless communication network 100 includes base stations (BSs) 102, user equipments (UEs) 104, and one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

A base station, such as BS 102, may include components that are located at a single physical location or components located at various physical locations. In examples in which the base station includes components that are located at various physical locations, the various components may each perform various functions such that, collectively, the various components achieve functionality that is similar to a base station that is located at a single physical location. As such, a base station may equivalently refer to a standalone base station or a base station including components that are located at various physical locations or virtualized locations. In some implementations, a base station including components that are located at various physical locations may be referred to as or may be associated with a disaggregated radio access network (RAN) architecture, such as an Open RAN (O-RAN) or Virtualized RAN (VRAN) architecture. In some implementations, such components of a base station may include or refer to one or more of a central unit (CU), a distributed unit (DU), or a radio unit (RU).

BSs 102 wirelessly communicate with UEs 104 via communications links 120. Each of BSs 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 further includes Primary Subscription Selection Component 198, which may be used configured to select a primary SIM for wakeup signal detection.

Figure 2:
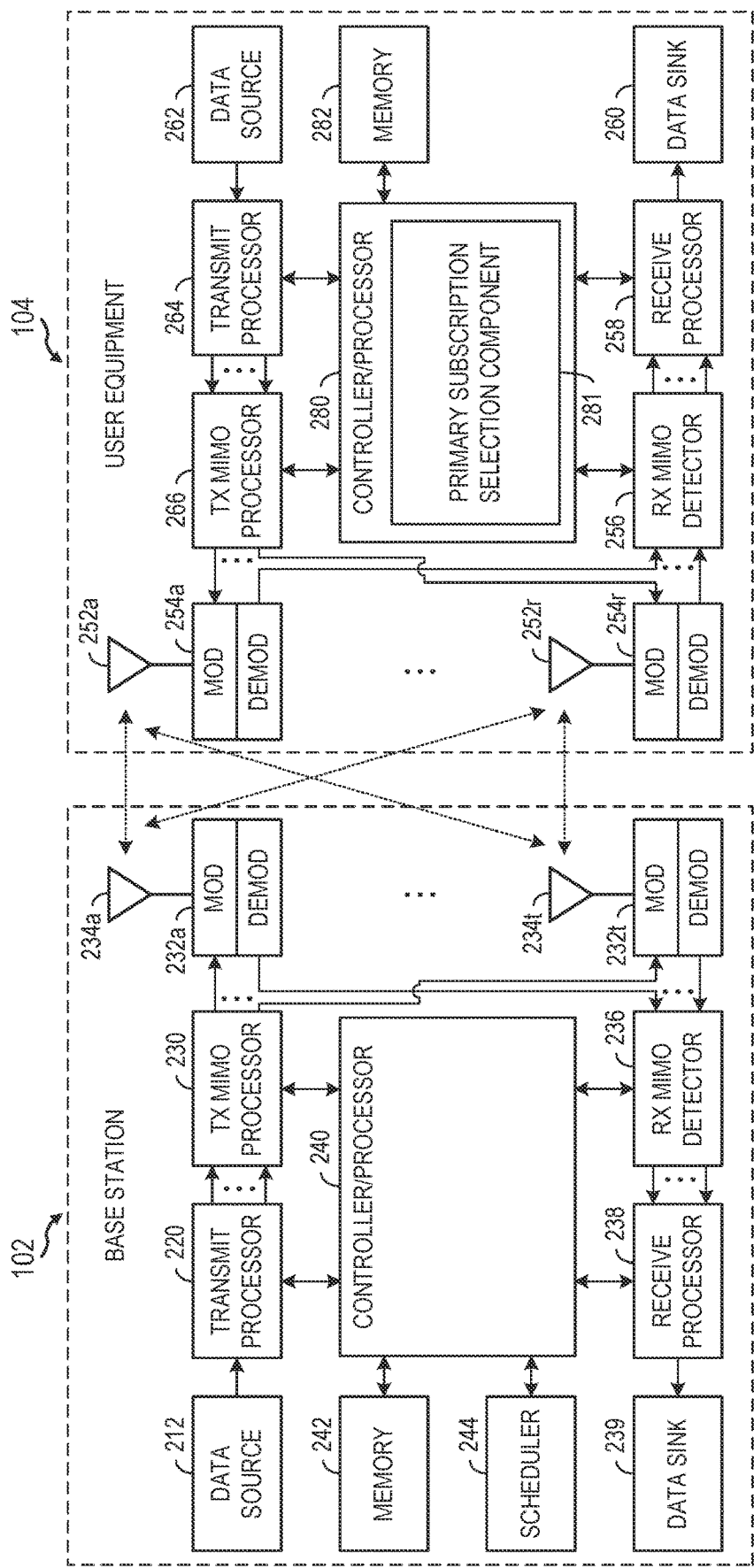
FIG. 2 is a block diagram conceptually illustrating aspects of an example of a base station and user equipment.

FIG. 2 depicts aspects of an example BS 102 and a UE 104. Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes Primary Subscription Selection Component 281, which may be representative of Primary Subscription Selection Component 198 of FIG. 1. Notably, while depicted as an aspect of controller/processor 280, Primary Subscription Selection Component 281 may be implemented additionally or alternatively in various other aspects of UE 104 in other implementations.

Figure 3:
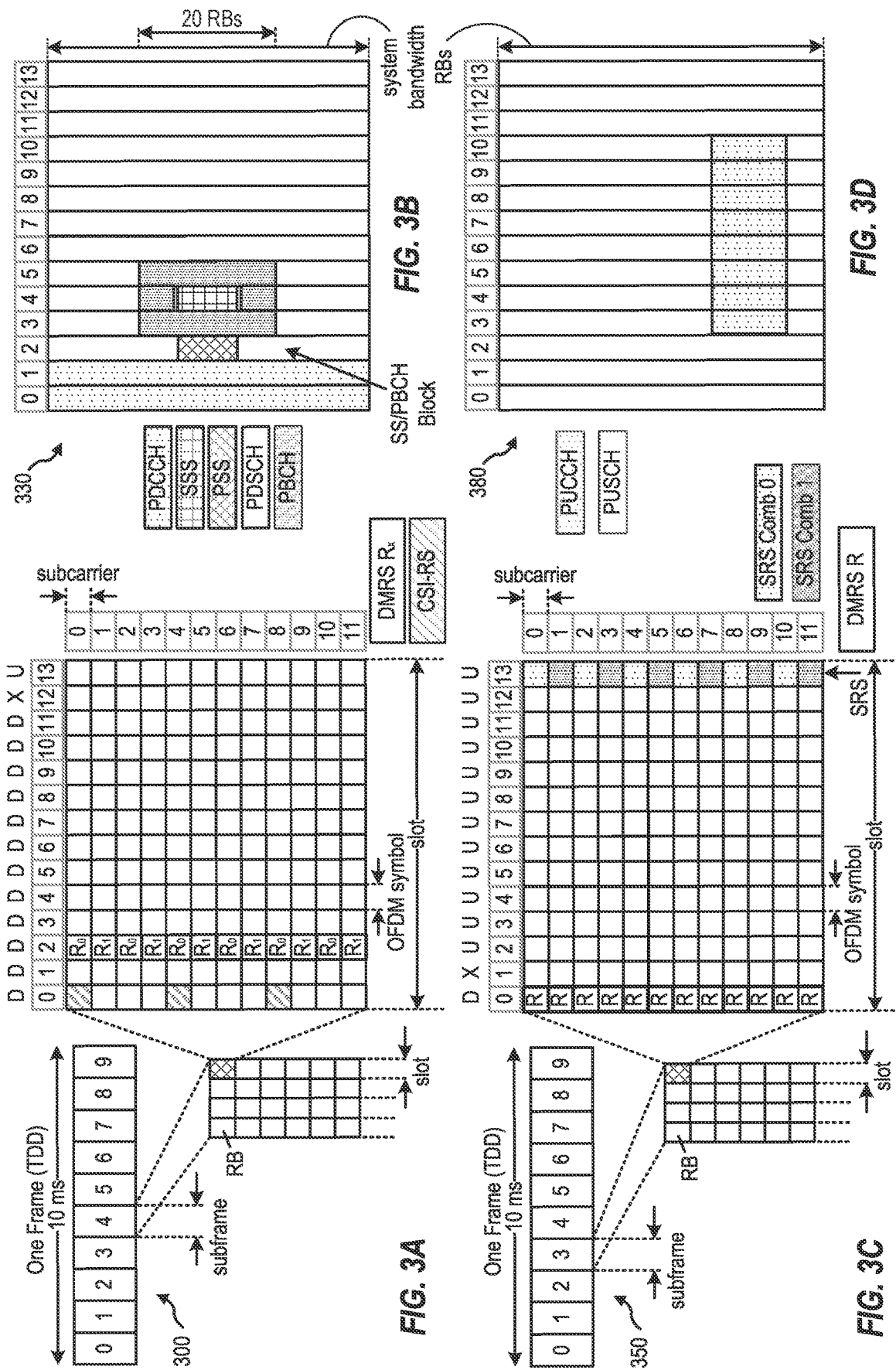
FIGS. 3A, 3B, 3C, and 3D depict various example aspects of data structures for a wireless communication network.

FIGS. 3A, 3B, 3C, and 3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A, 3B, 3C, and 3D are provided later in this disclosure.

Introduction to Connected Mode Discontinuous Reception

Figure 4:
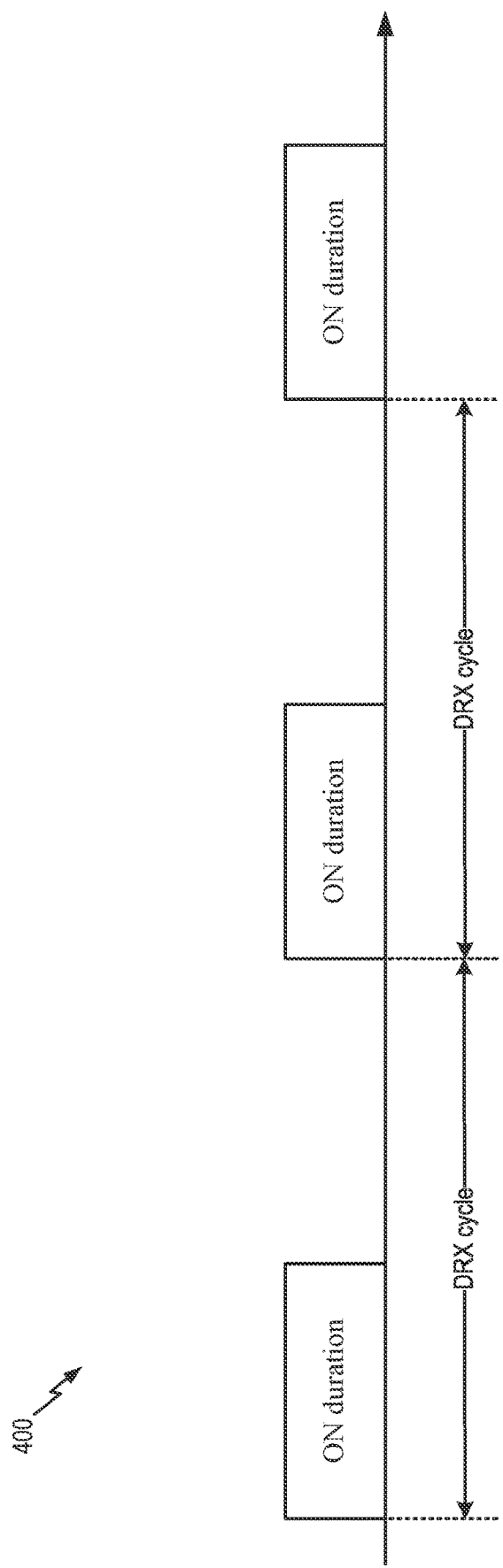
FIG. 4 illustrates an example timeline for discontinuous reception (DRX) cycles.

As illustrated in an example timing diagram 400 of FIG. 4, during periods of traffic inactivity, a user equipment (UE) may switch to a connected discontinuous reception (C-DRX) operation for power saving. A UE may be configured for C-DRX according to various configuration parameters, such as an inactivity timer, a short DRX timer, a short DRX cycle, and a long DRX cycle.

Based on configured cycles, the UE wakes up occasionally for ON durations and monitors for physical downlink control channel (PDCCH) transmissions. Except for ON durations, the UE may remain in a low power (sleep) state referred to as an OFF duration, for the rest of C-DRX cycle. During the OFF duration, the UE is not expected to transmit and receive any signal.

In a C-DRX mode, a UE wakes up and transmits and/or receives (TX/RX) data packets following C-DRX cycle (during a C-DRX ON period). In some cases, if the UE detects a PDCCH scheduling data during ON duration, the UE remains ON to transmit and receive data. Otherwise, the UE goes back to sleep at the end of the ON duration. This type of C-DRX mode has been used many years and is still default behavior of some new radio (NR) networks and UEs.

In some cases, with periodic C-DRX cycles, a UE may wake up frequently even when the UE has no data to transmit and/or to monitor for data (e.g., indicated by a page), which wastes UE power. Enlarging a C-DRX cycle may cause UEs to wake up less often, but this may also lead to increased data service latency (e.g., if a UE has packets to transmit well before the next C-DRX on duration).

Example Disaggregated Base Station Architecture

Figure 5:
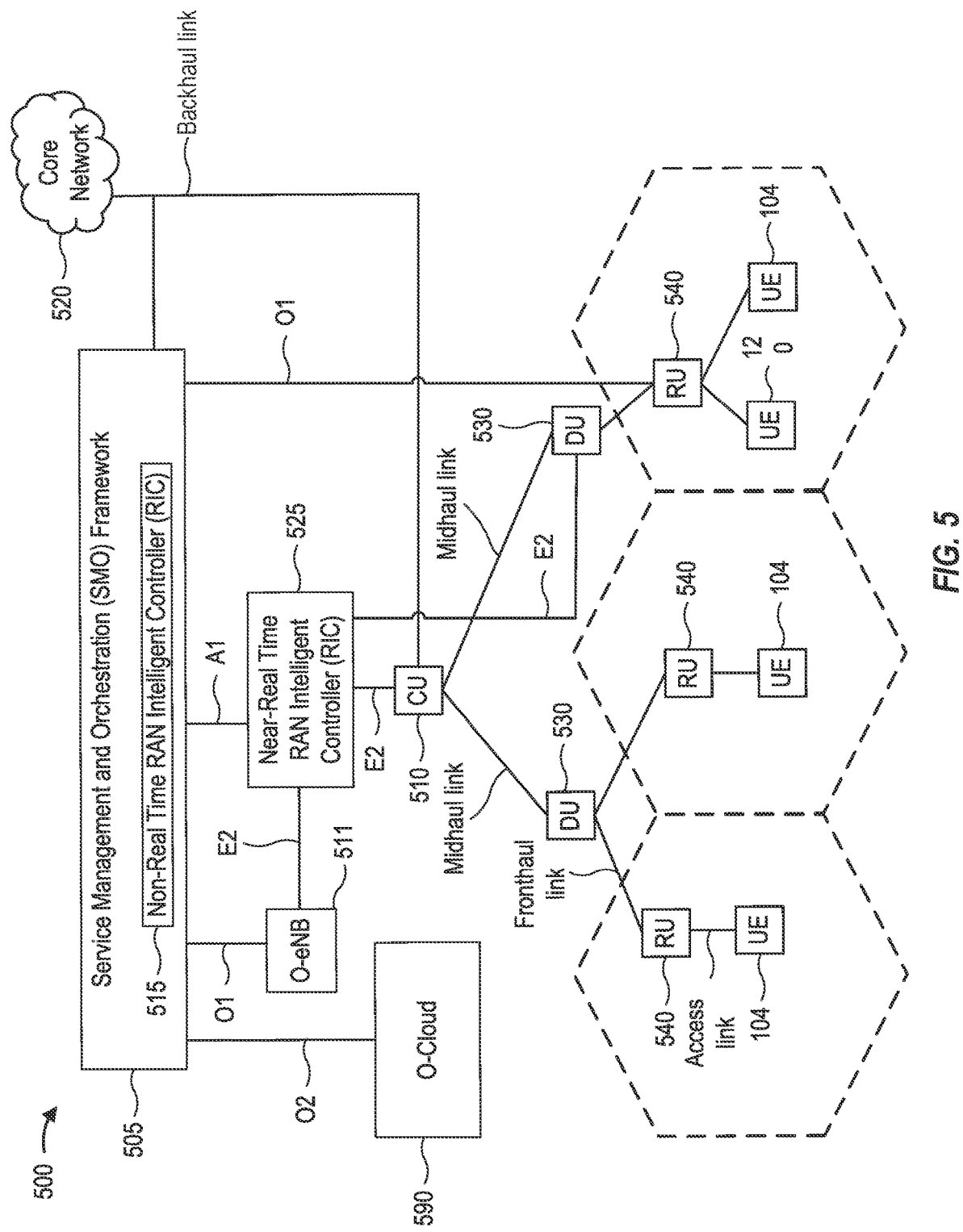
FIG. 5 depicts an example disaggregated base station architecture.

FIG. 5 depicts an example disaggregated base station 500 architecture. The disaggregated base station 500 architecture may include one or more central units (CUs) 510 that can communicate directly with a core network 520 via a backhaul link, or indirectly with the core network 520 through one or more disaggregated base station units (such as a Near-Real Time (Near-RT) RAN Intelligent Controller (RIC) 525 via an E2 link, or a Non-Real Time (Non-RT) RIC 515 associated with a Service Management and Orchestration (SMO) Framework 505, or both). A CU 510 may communicate with one or more distributed units (DUs) 530 via respective midhaul links, such as an F1 interface. The DUs 530 may communicate with one or more radio units (RUs) 540 via respective fronthaul links. The RUs 540 may communicate with respective UEs 104 via one or more radio frequency (RF) access links. In some implementations, the UE 104 may be simultaneously served by multiple RUs 540.

Each of the units, i.e., the CUs 510, the DUs 530, the RUs 540, as well as the Near-RT RICs 525, the Non-RT RICs 515 and the SMO Framework 505, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 510 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 510. The CU 510 may be configured to handle user plane functionality (i.e., Central Unit-User Plane (CU-UP)), control plane functionality (i.e., Central Unit-Control Plane (CU-CP)), or a combination thereof. In some implementations, the CU 510 can be logically split into one or more CU-UP units and one or more CU-CP units. The CU-UP unit can communicate bidirectionally with the CU-CP unit via an interface, such as the E1 interface when implemented in an O-RAN configuration. The CU 510 can be implemented to communicate with the DU 530, as necessary, for network control and signaling.

The DU 530 may correspond to a logical unit that includes one or more base station functions to control the operation of one or more RUs 540. In some aspects, the DU 530 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 530 may further host one or more low PHY layers. Each layer (or module) can be implemented with an interface configured to communicate signals with other layers (and modules) hosted by the DU 530, or with the control functions hosted by the CU 510.

Lower-layer functionality can be implemented by one or more RUs 540. In some deployments, an RU 540, controlled by a DU 530, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 540 can be implemented to handle over the air (OTA) communication with one or more UEs 104. In some implementations, real-time and non-real-time aspects of control and user plane communication with the RU(s) 540 can be controlled by the corresponding DU 530. In some scenarios, this configuration can enable the DU(s) 530 and the CU 510 to be implemented in a cloud-based RAN architecture, such as a vRAN architecture.

The SMO Framework 505 may be configured to support RAN deployment and provisioning of non-virtualized and virtualized network elements. For non-virtualized network elements, the SMO Framework 505 may be configured to support the deployment of dedicated physical resources for RAN coverage requirements which may be managed via an operations and maintenance interface (such as an O1 interface). For virtualized network elements, the SMO Framework 505 may be configured to interact with a cloud computing platform (such as an open cloud (O-Cloud) 590) to perform network element life cycle management (such as to instantiate virtualized network elements) via a cloud computing platform interface (such as an O2 interface). Such virtualized network elements can include, but are not limited to, CUs 510, DUs 530, RUs 540 and Near-RT RICs 525. In some implementations, the SMO Framework 505 can communicate with a hardware aspect of a 4G RAN, such as an open eNB (O-eNB) 511, via an O1 interface. Additionally, in some implementations, the SMO Framework 505 can communicate directly with one or more RUs 540 via an O1 interface. The SMO Framework 505 also may include a Non-RT RIC 515 configured to support functionality of the SMO Framework 505.

The Non-RT RIC 515 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 525. The Non-RT RIC 515 may be coupled to or communicate with (such as via an A1 interface) the Near-RT RIC 525. The Near-RT RIC 525 may be configured to include a logical function that enables near-real-time control and optimization of RAN elements and resources via data collection and actions over an interface (such as via an E2 interface) connecting one or more CUs 510, one or more DUs 530, or both, as well as an O-eNB, with the Near-RT RIC 525.

In some implementations, to generate AI/ML models to be deployed in the Near-RT RIC 525, the Non-RT RIC 515 may receive parameters or external enrichment information from external servers. Such information may be utilized by the Near-RT RIC 525 and may be received at the SMO Framework 505 or the Non-RT RIC 515 from non-network data sources or from network functions. In some examples, the Non-RT RIC 515 or the Near-RT RIC 525 may be configured to tune RAN behavior or performance. For example, the Non-RT RIC 515 may monitor long-term trends and patterns for performance and employ AI/ML models to perform corrective actions through the SMO Framework 505 (such as reconfiguration via O1) or via creation of RAN management policies (such as A1 policies).

Example Multiple Subscriber Identity Module (Multi-SIM) Device

Figure 6:
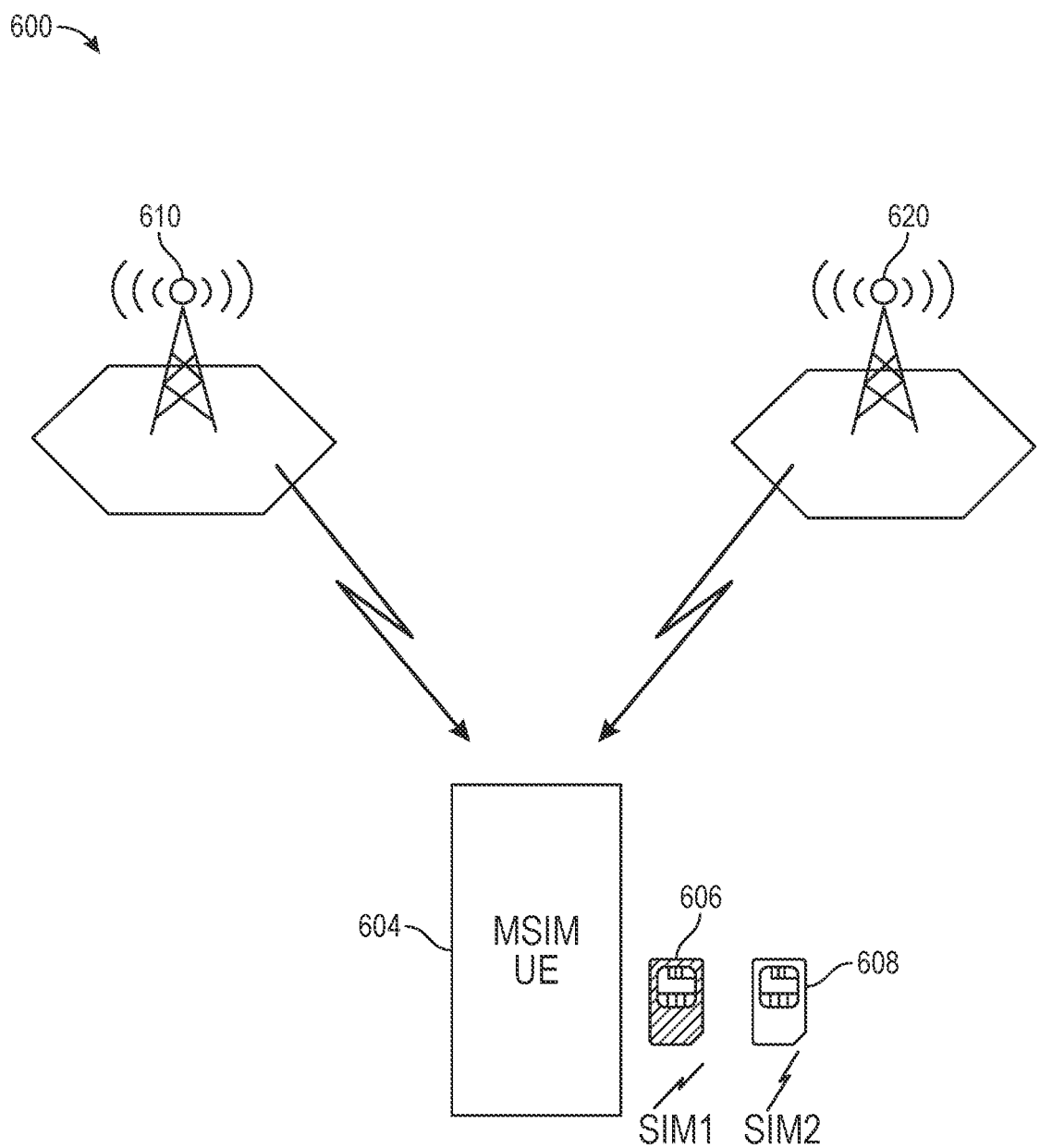
FIG. 6 illustrates an example multi-SIM deployment for a UE, in which certain aspects of the present disclosure may be implemented.

FIG. 6 illustrates an example multi-subscriber identity module (multi-SIM) deployment 600, in which a UE 604 supports multiple SIMs, SIM1 606 and SIM2 608, which may support the same or different radio access technologies (RATs). The UE 604 may be an example of UE 104, shown in FIGS. 1 and 2. SIM1 may have a subscription to a first network. The UE may communicate with that first network via a BS 610. SIM2 may have a subscription to a second network. The UE may communicate with that second network via a BS 620. Each of BS 610 and 620 may be examples of BS 102, shown in FIGS. 1 and 2. At any given time, the SIMs 606 and 608 may concurrently be in an idle state and may support different modes of operation. For example, if the UE has a single receiver, then the UE may support a Single Receive Dual SIM Dual Standby (SR-DSDS) mode, where only one RAT is received at a time. In another example, if the UE has two receivers, then the UE may support a Dual Receive Dual SIM Dual Standby (DR-DSDS) mode, wherein the UE may simultaneously receive multiple RATs.

Aspects Related to Selecting a Primary SIM For Wakeup Signal Detection

Figure 7A:
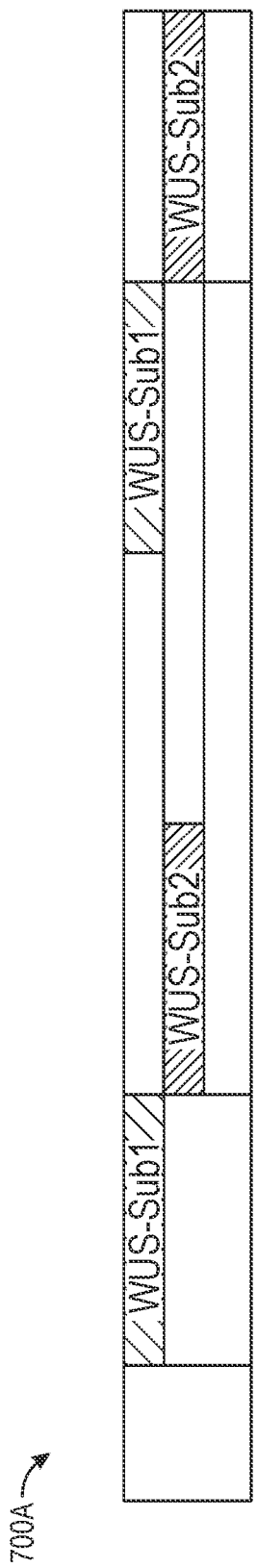
FIG. 7A illustrates an example timeline for wakeup signal decoding and sharing by both SIMs in a multi-SIM UE.

New radio (NR) wakeup signaling provides user equipments (UEs) with a means for saving power. FIG. 7A illustrates an example timeline 700A for wakeup signal decoding and sharing by both SIMs in a multi-SIM UE. As shown, in a multi-SIM device, such as a dual subscriber identity module (SIM) dual active (DSDA) UE, when both SIMs are in connected mode, both SIMs may wake up during an ON duration to monitor for a wakeup signal and to decode control information (e.g., control information with a DCI_2_6 format) in PDCCH each time that a wakeup signal is sent, whether or not a grant is present. Waking up both SIMs for wakeup signal detection and decoding requires increased battery power of mobile semiconductor devices.

Accordingly, in cases where both subscriptions have same public land mobile network (PLMN), instead of waking up both SIMs (e.g., subscriptions), it may be desirable for only one of the SIMs to wake up and decode the grant on behalf of both SIMs in order to save power. The SIM that is selected to perform the wakeup signal monitoring and decoding may be referred to as the primary SIM, and the other SIM may be referred to as the secondary SIM. The primary SIM may also perform wakeup signal sharing upon detection and decoding of a wakeup signal. Wakeup signal sharing may allow the primary SIM to help make the secondary SIM aware of the wakeup signal before the secondary SIM would have detected and decoded the grant.

In aspects of the present disclosure, a multi-SIM device (e.g., a UE having a first SIM and a second SIM) may select, from the first SIM and the second SIM, a primary SIM and a secondary SIM. The primary SIM may monitor for a wakeup signal on behalf of both SIMs. The primary SIM may decode downlink control information (DCI) which includes a wakeup grant. The primary SIM may then indicate the wakeup grant to the second SIM based on the DCI. In response to the indication of the wakeup grant, at least one of the primary SIM and the secondary SIM may take one or more actions. For example, the secondary SIM may be configured to exit a sleep mode (e.g., wake up) in response to the indication of the wakeup grant. The secondary SIM may also be configured to monitor for one or more signals in response to the indication of the wakeup grant.

Figure 7B:
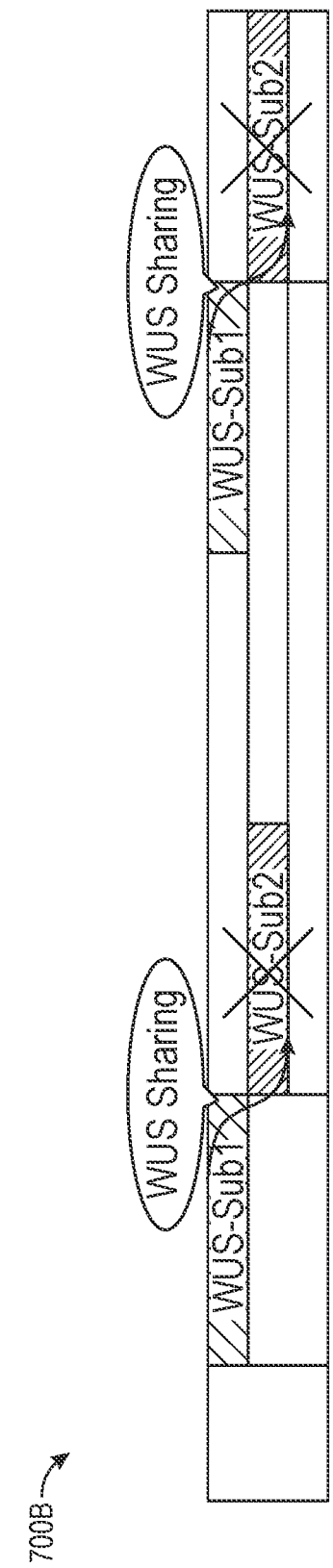
FIG. 7B illustrates an example timeline for wakeup signal decoding and sharing by a primary SIM, in accordance with certain aspects of the present disclosure.

FIG. 7B illustrates an example timeline 700B for wakeup signal decoding and sharing by a primary SIM. In this case, a first SIM (e.g., Sub1) may be selected as the primary SIM. As illustrated, instead of waking up both SIMs for wakeup detection and decoding, Sub1 performs wakeup signal detection, while a second SIM (e.g., Sub2) does not (e.g., as illustrated by the "X" over Sub2). That is, in some cases, only the primary SIM decodes DCI. Sub1 may then indicate (e.g., share) the wakeup signal with Sub2 (e.g., as illustrated by the arrow from Sub1 to Sub2).

The UE may consider several factors when determining which SIM to select as the primary SIM. In one example aspect, one of the SIMs may be operating in a connected mode and the other SIM may be operating in a connected discontinuous repetition (DRX) mode. The connected mode may be a mode in which the SIM is continuously connected to the network (e.g., no DRX is performed). In this case, because the SIM in connected DRX mode is in an idle mode and only periodically wakes up, power saving may be achieved by keeping the connected DRX SIM in the idle mode. Accordingly, the SIM in connected mode may be selected as the primary SIM to decode the wakeup signal (e.g., obtain control information in a DCI_2_6 format) for the other SIM whenever a grant is received. As a result, the connected DRX SIM does not use power to wake up, thereby saving battery power.

In one example aspect, both SIMs may operate in the connected DRX mode. Additionally, one of the SIMs may have a higher DRX cycle periodicity than the other (e.g., one SIM may enter an ON duration to monitor for a wakeup signal more frequently than the other SIM). In this case, it may be desirable to select the SIM with a higher DRX cycle periodicity as the primary SIM. For example, if a first SIM performs a DRX check every 80 ms and a second SIM performs DRX check every 160 ms then the first SIM should be selected since it will check for the wakeup signal more frequently. The UE may skip waking up the secondary SIM since the primary SIM is configured to check for wakeup signals more frequently than the secondary SIM, and therefore has a higher likelihood of detecting a wakeup signal during a given DRX cycle. This allows the UE to improve power savings without impacting performance (e.g., without creating latency issues).

In another example aspect, if both SIMs have the same DRX cycle periodicity, then the SIM with better signal strength may be chosen to perform the wakeup signal detecting and decoding. The UE with better signal strength may be more reliable and have a higher likelihood of detecting a grant. In determining signal strength, the UE may measure the signal-to-noise ratio (SNR) for each of the SIMs. In some cases, the UE may prioritize the SIM with the better signal strength over the SIM with the higher periodicity. The UE may reevaluate the signal strength when it moves to another area, for example, when entering a new cell.

In some examples, the UE may consider historical transmission data when selecting a primary SIM. For example, the UE may select the SIM that has had more transmissions and receptions in a recent time period as the primary SIM.

In some cases, the UE may determine to not select a primary SIM when both SIMs have very low DRX cycle periodicity (e.g., greater than 160 ms) to avoid latency issue. For example, if both SIMs perform DRX check every 320 ms, then the UE may have both SIMs wake up for decoding WUS. The threshold for DRX cycle periodicity may be selected based on whether the secondary SIM would receive the wakeup signal from the primary SIM and wake up in time to receive and act on the corresponding grant.

Example Wireless Methods

Figure 8:
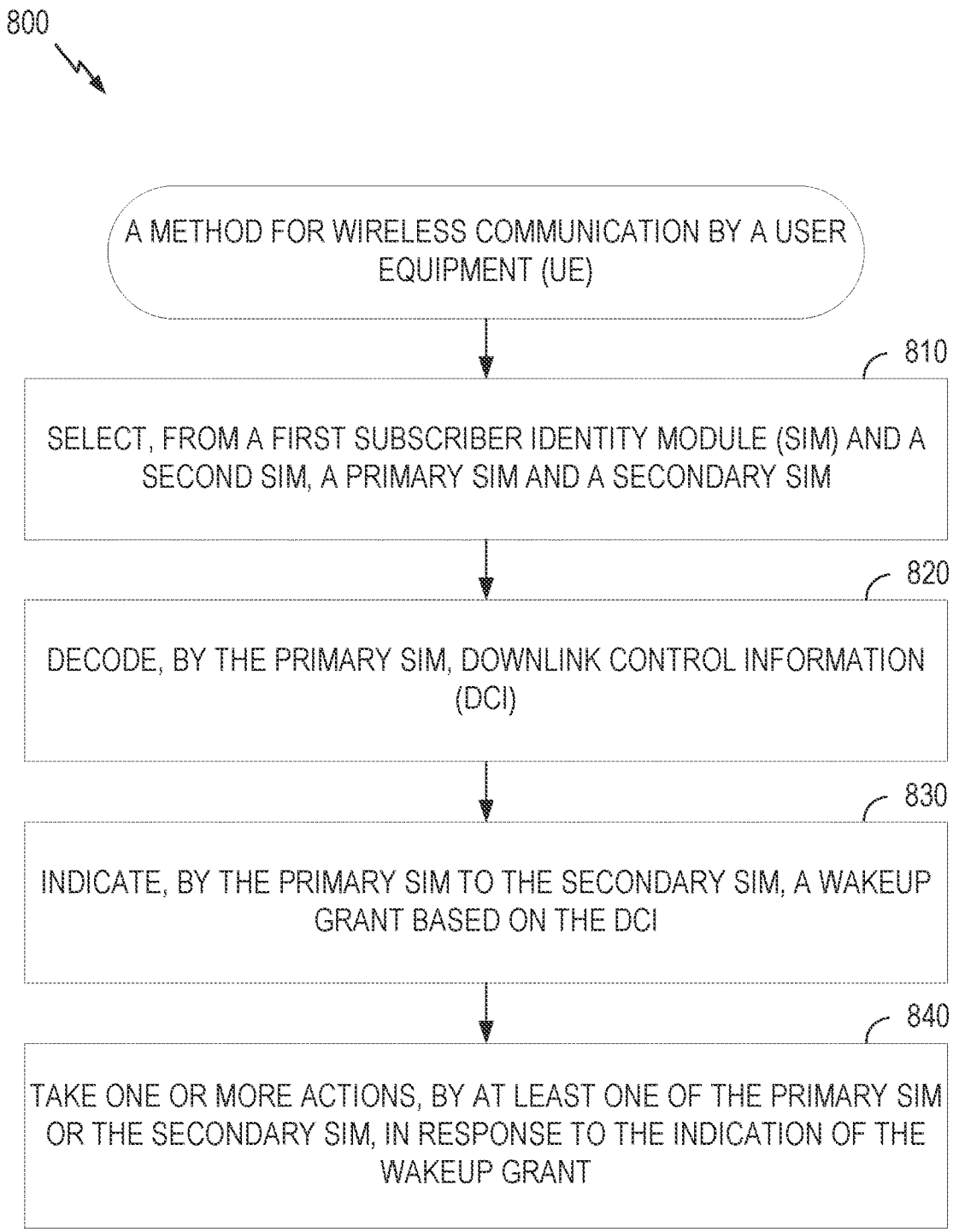
FIG. 8 illustrates example operations for wireless communications by a UE having a first SIM and a second SIM, in accordance with certain aspects of the present disclosure.

FIG. 8 illustrates example operations 800 for wireless communications by a UE, in accordance with certain aspects of the present disclosure. For example, operations 800 may be performed by a user equipment (UE) 104 of FIG. 1 for selecting a primary subscriber identity module (SIM) for wakeup signal detection.

Operations 800 begin at 810, with the UE selecting, from a first SIM and a second SIM, a primary SIM and a secondary SIM. At 820, the primary SIM may decode downlink control information (DCI). In some cases, only the primary SIM (and not the secondary SIM) decodes the DCI.

At 830, the primary SIM may indicate to the secondary SIM a wakeup grant based on the DCI. In some examples, the secondary SIM may be configured to remain in a sleep mode until the primary SIM indicates the wakeup grant. At 840, at least one of the primary SIM or the secondary SIM may take one or more actions in response to the indication of the wakeup grant.

In some examples, selecting the primary SIM involves determining that one of the first SIM and the second SIM is in a connected mode; determining that another one of the first SIM or the second SIM is in a connected discontinuous reception (DRX) mode; and selecting, as the primary SIM, the SIM that is in the connected mode.

In certain other examples, the first SIM and the second SIM may both be in a connected discontinuous reception (DRX) mode. In this case, selecting the primary SIM may involve determining that the first SIM is configured to perform DRX at a first periodicity; determining that the second SIM is configured to perform DRX at a second periodicity; and selecting the primary SIM based on the first and second periodicities. In some cases, selecting the primary SIM based on the first and second periodicities involves selecting the first SIM when the first periodicity is higher than the second periodicity; and selecting the second SIM when the second periodicity is higher than the first periodicity. In some examples, the first and second periodicities are less than or equal to $1/160$ ms.

In some examples, where the first SIM and the second SIM may both be in a connected DRX mode, selecting the primary SIM may involve estimating a first signal strength of the first SIM and a second signal strength of the second SIM; and selecting the primary SIM based on the first and second signal strengths. In this case, selecting the primary SIM based on the first and second signal strengths may involve selecting the first SIM when the first signal strength is greater than the second signal strength; and selecting the second SIM when the second signal strength is greater than the first signal strength.

In some examples, when the UE enters a new cell, the operations 800 may further involve estimating a first signal strength of the first SIM and a second signal strength of the second SIM when the UE enters a new cell. In certain examples, the first and second signal strengths may be estimated based on a signal-to-noise ratio (SNR), and wherein a higher SNR value indicates a greater signal strength.

According to certain aspects, selecting the primary SIM may involve storing data related to transmission and reception history of the first SIM and the second SIM; and selecting the primary SIM based on the stored data. In some examples, selecting the primary SIM based on the stored data may involve selecting, based on the stored data related to transmission and reception history, the SIM that receives more data. In some examples, selecting the primary SIM based on the stored data may involve selecting, based on the stored data related to transmission and reception history, the SIM that transmits more data.

Example Wireless Communication Device

Figure 9:
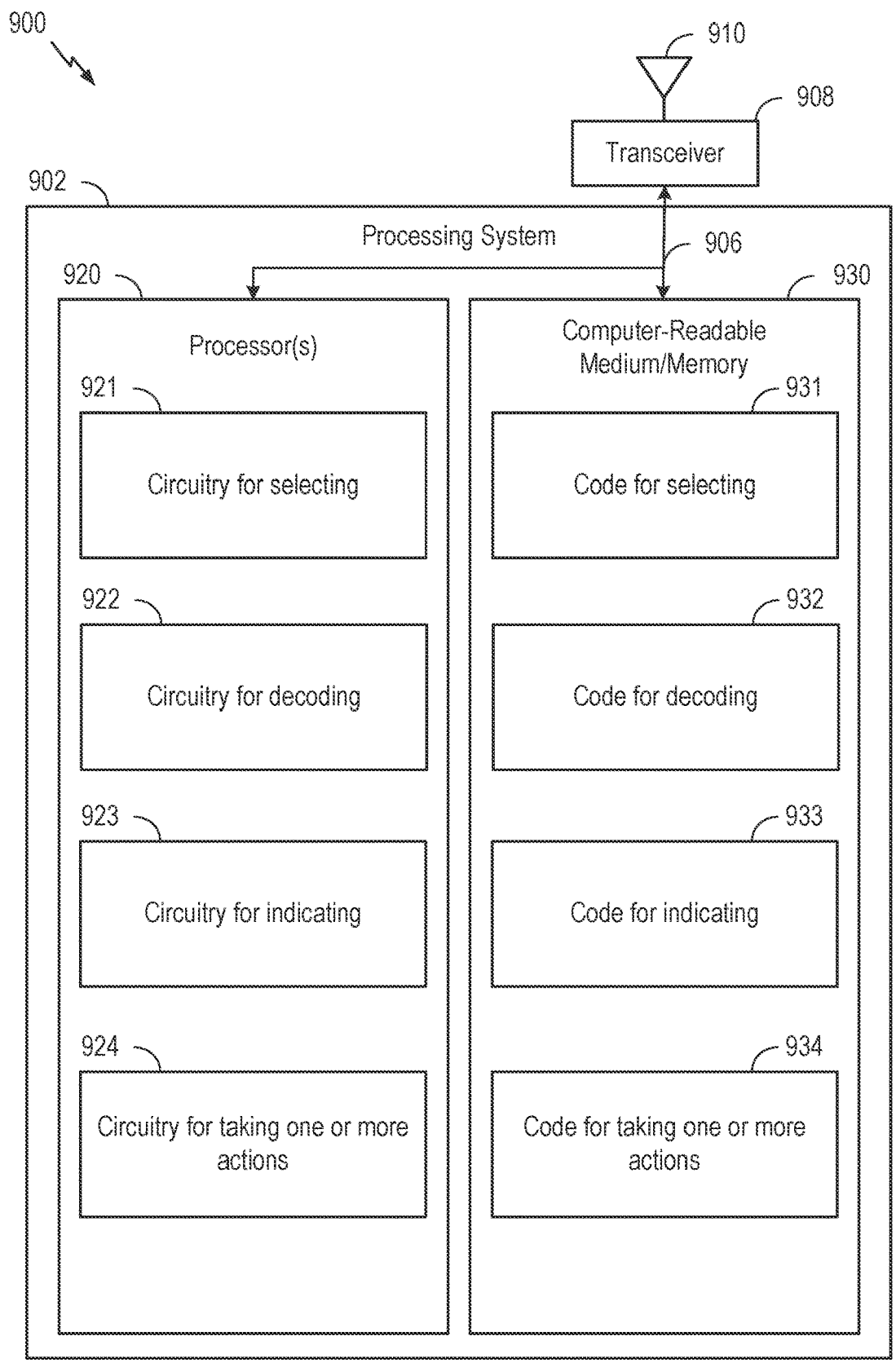
FIG. 9 depicts components of an example communications device.

FIG. 9 depicts an example communications device 900 that includes various components operable, configured, or adapted to perform operations for the techniques disclosed herein. In some examples, communication device 900 may be a UE 104 as described, for example with respect to FIGS. 1 and 2.

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by the one or more processors 920, cause the one or more processors 920 to perform the various techniques discussed herein for selecting a primary SIM for wakeup signal detection and decoding to improve power saving.

In the depicted example, computer-readable medium/memory 930 stores code 931 for selecting, from a first SIM and a second SIM, a primary SIM and a secondary SIM, code 932 for decoding, by the primary SIM, downlink control information (DCI), code 933 for indicating, by the primary SIM to the secondary SIM, a wakeup grant based on the DCI, and code 934 for taking one or more actions, by at least one of the primary SIM or the secondary SIM, in response to the indication of the wakeup grant.

In the depicted example, the one or more processors 920 include circuitry configured to implement the code stored in the computer-readable medium/memory 930, including circuitry 921 for selecting, from the first SIM and the second SIM, a primary SIM and a secondary SIM, circuitry 922 for decoding, by the primary SIM, DCI, circuitry 923 for indicating, by the primary SIM to the secondary SIM, a wakeup grant based on the DCI, and circuitry 924 for taking one or more actions, by at least one of the primary SIM or the secondary SIM, in response to the indication of the wakeup grant.

Various components of communications device 900 may provide means for performing the methods described herein.

In some examples, means for transmitting or sending (or means for outputting for transmission) may include the transceivers 254 and/or antenna(s) 252 of the UE 104 illustrated in FIG. 2 and/or transceiver 908 and antenna 910 of the communication device 900 in FIG. 9.

In some examples, means for receiving (or means for obtaining) may include the transceivers 254 and/or antenna(s) 252 of the UE 104 illustrated in FIG. 2 and/or transceiver 908 and antenna 910 of the communication device 900 in FIG. 9.

In some examples, means for detecting or determining may include various processing system components, such as: the one or more processors 920 in FIG. 9, or aspects of the UE 104 depicted in FIG. 2, including receive processor 258, transmit processor 264, TX MIMO processor 266, and/or controller/processor 280 (including Primary Subscription Selection Component 281).

Notably, FIG. 9 is an example, and many other examples and configurations of communication device 900 are possible.

Example Clauses

Implementation examples are described in the following numbered clauses:

Clause 1: A method for wireless communication by a user equipment (UE) having a first subscriber identity module (SIM) and a second SIM, comprising: selecting, from the first SIM and the second SIM, a primary SIM and a secondary SIM; decoding, by the primary SIM, downlink control information (DCI); indicating, by the primary SIM to the secondary SIM, a wakeup grant based on the DCI; and taking one or more actions, by at least one of the primary SIM or the secondary SIM, in response to the indication of the wakeup grant.

Clause 2: The method of clause 1, wherein only the primary SIM decodes the DCI.

Clause 3: The method of clause 2, wherein the secondary SIM is configured to remain in a sleep mode until the primary SIM indicates the wakeup grant.

Clause 4: The method of any one of clauses 1-3, wherein taking one or more actions comprises at least one of: exiting, by the second SIM, a sleep mode; or monitoring, by the second SIM, for one or more signals.

Clause 5: The method of any one of clauses 1-4, wherein selecting the primary SIM comprises: determining that one of the first SIM and the second SIM is in a connected mode; and determining that another one of the first SIM or the second SIM is in a connected discontinuous reception (DRX) mode; and selecting, as the primary SIM, the SIM that is in the connected mode.

Clause 6: The method of any one of clauses 1-5, wherein the first SIM and the second SIM are in a connected discontinuous reception (DRX) mode, and selecting the primary SIM comprises: determining that the first SIM is configured to perform DRX at a first periodicity; determining that the second SIM is configured to perform DRX at a second periodicity; and selecting the primary SIM based on the first and second periodicities.

Clause 7: The method of clause 6, wherein selecting the primary SIM based on the first and second periodicities comprises: selecting the first SIM when the first periodicity is higher than the second periodicity; and selecting the second SIM when the second periodicity is higher than the first periodicity.

Clause 8: The method of any one of clauses 6 and 7, wherein the first and second periodicities are less than or equal to $1/160$ ms.

Clause 9: The method of any one of clauses 1-8, wherein the first SIM and the second SIM are in a connected discontinuous reception (DRX) mode, and selecting the primary SIM comprises: estimating a first signal strength of the first SIM and a second signal strength of the second SIM; and selecting the primary SIM based on the first and second signal strengths.

Clause 10: The method of clause 9, wherein selecting the primary SIM based on the first and second signal strengths comprises: selecting the first SIM when the first signal strength is greater than the second signal strength; and selecting the second SIM when the second signal strength is greater than the first signal strength.

Clause 11: The method of clause 10, further comprising, when the UE enters a new cell, estimating a first signal strength of the first SIM and a second signal strength of the second SIM when the UE enters a new cell.

Clause 12: The method of any one of clauses 10 and 11, wherein the first and second signal strengths are estimated based on a signal-to-noise ratio (SNR), and wherein a higher SNR value indicates a greater signal strength.

Clause 13: The method of any one of clauses 1-12, wherein selecting the primary SIM comprises: storing data related to transmission and reception history of the first SIM and the second SIM; and selecting the primary SIM based on the stored data.

Clause 14: The method of clause 13, wherein selecting the primary SIM based on the stored data comprises selecting, based on the stored data related to transmission and reception history, the SIM that receives more data.

Clause 15: The method of any one of clauses 13 and 14, wherein selecting the primary SIM based on the stored data comprises selecting, based on the stored data related to transmission and reception history, the SIM that transmits more data.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL).

The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of transmit assistance information to request changes to discontinuous reception (DRX) parameters to improve performance of a wireless network connection in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user equipment (as in the example UE 104 of FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a user equipment (UE) having a first subscriber identity module (SIM) and a second SIM, comprising:
   selecting, from the first SIM and the second SIM, a primary SIM and a secondary SIM;
   decoding, by the primary SIM, downlink control information (DCI);
   indicating, by the primary SIM to the secondary SIM, a wakeup grant based on the DCI; and
   taking one or more actions, by at least one of the primary SIM or the secondary SIM, in response to the indication of the wakeup grant.

2. The method of claim 1, wherein only the primary SIM decodes the DCI.

3. The method of claim 2, wherein the secondary SIM is configured to remain in a sleep mode until the primary SIM indicates the wakeup grant.

4. The method of claim 1, wherein taking one or more actions comprises at least one of:
   exiting, by the second SIM, a sleep mode; or
   monitoring, by the second SIM, for one or more signals.

5. The method of claim 1, wherein selecting the primary SIM comprises:
   determining that one of the first SIM and the second SIM is in a connected mode; and determining that another one of the first SIM or the second SIM is in a connected discontinuous reception (DRX) mode; and selecting, as the primary SIM, the SIM that is in the connected mode.

6. The method of claim 1, wherein the first SIM and the second SIM are in a connected discontinuous reception (DRX) mode, and selecting the primary SIM comprises:

determining that the first SIM is configured to perform DRX at a first periodicity;

determining that the second SIM is configured to perform DRX at a second periodicity; and selecting the primary SIM based on the first and second periodicities.

7. The method of claim 6, wherein selecting the primary SIM based on the first and second periodicities comprises:

selecting the first SIM when the first periodicity is higher than the second periodicity; and selecting the second SIM when the second periodicity is higher than the first periodicity.

8. The method of claim 6, wherein the first and second periodicities are less than or equal to $1/160$ ms.

9. The method of claim 1, wherein the first SIM and the second SIM are in a connected discontinuous reception (DRX) mode, and selecting the primary SIM comprises:

estimating a first signal strength of the first SIM and a second signal strength of the second SIM; and selecting the primary SIM based on the first and second signal strengths.

10. The method of claim 9, wherein selecting the primary SIM based on the first and second signal strengths comprises:

selecting the first SIM when the first signal strength is greater than the second signal strength; and selecting the second SIM when the second signal strength is greater than the first signal strength.

11. The method of claim 10, further comprising estimating a first signal strength of the first SIM and a second signal strength of the second SIM when the UE enters a new cell.

12. The method of claim 10, wherein the first and second signal strengths are estimated based on a signal-to-noise ratio (SNR), and wherein a higher SNR value indicates a greater signal strength.

13. The method of claim 1, wherein selecting the primary SIM comprises:

storing data related to transmission and reception history of the first SIM and the second SIM; and selecting the primary SIM based on the stored data.

14. The method of claim 13, wherein selecting the primary SIM based on the stored data comprises selecting, based on the stored data related to transmission and reception history, the SIM that receives more data.

15. The method of claim 13, wherein selecting the primary SIM based on the stored data comprises selecting, based on the stored data related to transmission and reception history, the SIM that transmits more data.

16. A user equipment (UE) configured for wireless communication, comprising:

a first subscriber identity module (SIM);

a second SIM;

a memory comprising computer-executable instructions; and one or more processors configured to execute the computer-executable instructions and cause the UE to:

select, from the first SIM and the second SIM, a primary SIM and a secondary SIM;

decode, by the primary SIM, downlink control information (DCI);

indicate, by the primary SIM to the secondary SIM, a wakeup grant based on the DCI; and take one or more actions, by at least one of the primary SIM or the secondary SIM, in response to the indication of the wakeup grant.

17. The UE of claim 16, wherein only the primary SIM decodes the DCI.

18. The UE of claim 17, wherein the secondary SIM is configured to remain in a sleep mode until the primary SIM indicates the wakeup grant.

19. The UE of claim 16, wherein causing the UE to take one or more actions comprises the one or more processors executing the computer-executable instructions and causing the second SIM to at least one of:

exit a sleep mode; or monitor for one or more signals.

20. The UE of claim 16, wherein causing the UE to select the primary SIM comprises the one or more processors executing the computer-executable instructions and causing the UE to:

determine that one of the first SIM and the second SIM is in a connected mode; and determine that another one of the first SIM or the second SIM is in a connected discontinuous reception (DRX) mode; and select, as the primary SIM, the SIM that is in the connected mode.

21. The UE of claim 16, wherein the first SIM and the second SIM are in a connected discontinuous reception (DRX) mode, and causing the UE to select the primary SIM comprises the one or more processors executing the computer-executable instructions and causing the UE to:

determine that the first SIM is configured to perform DRX at a first periodicity;

determine that the second SIM is configured to perform DRX at a second periodicity; and select the primary SIM based on the first and second periodicities.

22. The UE of claim 21, wherein causing the UE to select the primary SIM based on the first and second periodicities comprises the one or more processors executing the computer-executable instructions and causing the UE to:

select the first SIM when the first periodicity is higher than the second periodicity; and select the second SIM when the second periodicity is higher than the first periodicity.

23. The UE of claim 16, wherein the first SIM and the second SIM are in a connected discontinuous reception (DRX) mode, and causing the UE to select the primary SIM comprises the one or more processors executing the computer-executable instructions and causing the UE to:

estimate a first signal strength of the first SIM and a second signal strength of the second SIM; and select the primary SIM based on the first and second signal strengths.

24. The UE of claim 23, wherein causing the UE to select the primary SIM based on the first and second signal strengths comprises the one or more processors executing the computer-executable instructions and causing the UE to:

select the first SIM when the first signal strength is greater than the second signal strength; and select the second SIM when the second signal strength is greater than the first signal strength.

25. The UE of claim 24, wherein, when the UE enters a new cell, the one or more processors are configured to execute the computer-executable instructions and further cause the UE to estimate a first signal strength of the first SIM and a second signal strength of the second SIM when the UE enters a new cell.

26. The UE of claim 16, wherein causing the UE to select the primary SIM comprises the one or more processors executing the computer-executable instructions and causing the UE to:
store data related to transmission and reception history of the first SIM and the second SIM; and
select the primary SIM based on the stored data.

27. The UE of claim 26, wherein causing the UE to select the primary SIM based on the stored data comprises the one or more processors executing the computer-executable instructions and causing the UE to select, based on the stored data related to transmission and reception history, the SIM that receives more data.

28. The UE of claim 26, wherein causing the UE to select the primary SIM based on the stored data comprises the one or more processors executing the computer-executable instructions and causing the UE to select, based on the stored data related to transmission and reception history, the SIM that transmits more data.

29. An apparatus for wireless communication at a user equipment (UE) having a first subscriber identity module (SIM) and a second SIM, comprising:
means for selecting, from the first SIM and the second SIM, a primary SIM and a secondary SIM;
means for decoding, by the primary SIM, downlink control information (DCI);
means for indicating, by the primary SIM to the secondary SIM, a wakeup grant based on the DCI; and
means for taking one or more actions, by at least one of the primary SIM or the secondary SIM, in response to the indication of the wakeup grant.

30. A non-transitory computer-readable medium having instructions to cause a user equipment (UE), having a first subscriber identity module (SIM) and a second SIM, to:
select, from the first SIM and the second SIM, a primary SIM and a secondary SIM;
decode, by the primary SIM, downlink control information (DCI);
indicate, by the primary SIM to the secondary SIM, a wakeup grant based on the DCI; and
take one or more actions, by at least one of the primary SIM or the secondary SIM, in response to the indication of the wakeup grant.

* * * * *